(12) United States Patent
Tokoyoda et al.

(10) Patent No.: US 10,078,602 B2
(45) Date of Patent: Sep. 18, 2018

(54) INFORMATION PROCESSING APPARATUS, MEMORY CONTROLLER, AND MEMORY CONTROL METHOD

(71) Applicant: FUJITSU LIMITED, Kawasaki-shi, Kanagawa (JP)

(72) Inventors: Akio Tokoyoda, Fuchu (JP); Masatoshi Aihara, Hiratsuka (JP); Koichiro Takayama, Hachioji (JP); Koji Hosoe, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 15/095,203

(22) Filed: Apr. 11, 2016

(65) Prior Publication Data

US 2016/0342541 A1    Nov. 24, 2016

(30) Foreign Application Priority Data

May 18, 2015   (JP) ................. 2015-101267

(51) Int. Cl.
*G06F 13/36* (2006.01)
*G06F 13/38* (2006.01)
*G06F 13/16* (2006.01)

(52) U.S. Cl.
CPC ...... *G06F 13/1673* (2013.01); *G06F 13/1642* (2013.01)

(58) Field of Classification Search
None
See application file for complete search history.

(56) References Cited

U.S. PATENT DOCUMENTS

| | | | | |
|---|---|---|---|---|
| 2003/0058873 | A1* | 3/2003 | Geiger | H04L 49/351 370/401 |
| 2004/0030849 | A1* | 2/2004 | Borkenhagen | G06F 13/1647 711/156 |
| 2006/0184752 | A1 | 8/2006 | Takano | |
| 2007/0286009 | A1* | 12/2007 | Norman | G11C 5/02 365/230.03 |
| 2008/0177994 | A1* | 7/2008 | Mayer | G06F 9/4418 713/2 |
| 2008/0215832 | A1* | 9/2008 | Allen | G06F 13/4243 711/158 |

(Continued)

FOREIGN PATENT DOCUMENTS

| | | |
|---|---|---|
| JP | 09-198300 | 7/1997 |
| JP | 2006-215799 | 8/2006 |

*Primary Examiner* — Michael Sun
(74) *Attorney, Agent, or Firm* — Fujitsu Patent Center

(57) ABSTRACT

An information processing apparatus includes: a memory device configured to store data; an arithmetic processor configured to issue a request to be transmitted to the memory device; and a memory controller including: a buffer configured to store one or more unselected requests that are issued by the arithmetic processing processor and are not selected; a history register configured to hold one or more addresses for one or more transmitted requests that have been transmitted to the memory device; and a selection unit configured to select, from the one or more unselected requests stored in the buffer, a target request to be transmitted to the memory device based on the one or more addresses stored in the history register and transmit the target request to the memory device.

14 Claims, 6 Drawing Sheets

(56) References Cited

U.S. PATENT DOCUMENTS

2008/0301256 A1\* 12/2008 McWilliams ....... G06F 12/0284
709/214
2014/0089595 A1\* 3/2014 Hyuseinova ............ G06F 12/08
711/134

\* cited by examiner

INFORMATION PROCESSING APPARATUS, MEMORY CONTROLLER, AND MEMORY CONTROL METHOD

CROSS-REFERENCE TO RELATED APPLICATION

This application is based upon and claims the benefit of priority of the prior Japanese Patent Application No. 2015-101267, filed on May 18, 2015, the entire contents of which are incorporated herein by reference.

FIELD

The embodiment discussed herein is related to an information processing apparatus, a memory controller, and a memory control method.

BACKGROUND

With the advances in the fractionalization of manufacturing processes of processors included in information processing apparatuses such as high performance computers (HPCs), servers, personal computers (PCs), and mobile phones, and the computation speed per processor has been improved. This involves desire to increase the capacity and band of a main memory.

Japanese Laid-open Patent Publication No. 2006-215799 and Japanese Laid-open Patent Publication No. 9-198300 discuss related art.

SUMMARY

According to an aspect of the embodiments, an information processing apparatus includes: a memory device configured to store data; an arithmetic processor configured to issue a request to be transmitted to the memory device; and a memory controller including: a buffer configured to store one or more unselected requests that are issued by the arithmetic processing processor and are not selected; a history register configured to hold one or more addresses for one or more transmitted requests that have been transmitted to the memory device; and a selection unit configured to select, from the one or more unselected requests stored in the buffer, a target request to be transmitted to the memory device based on the one or more addresses stored in the history register and transmit the target request to the memory device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
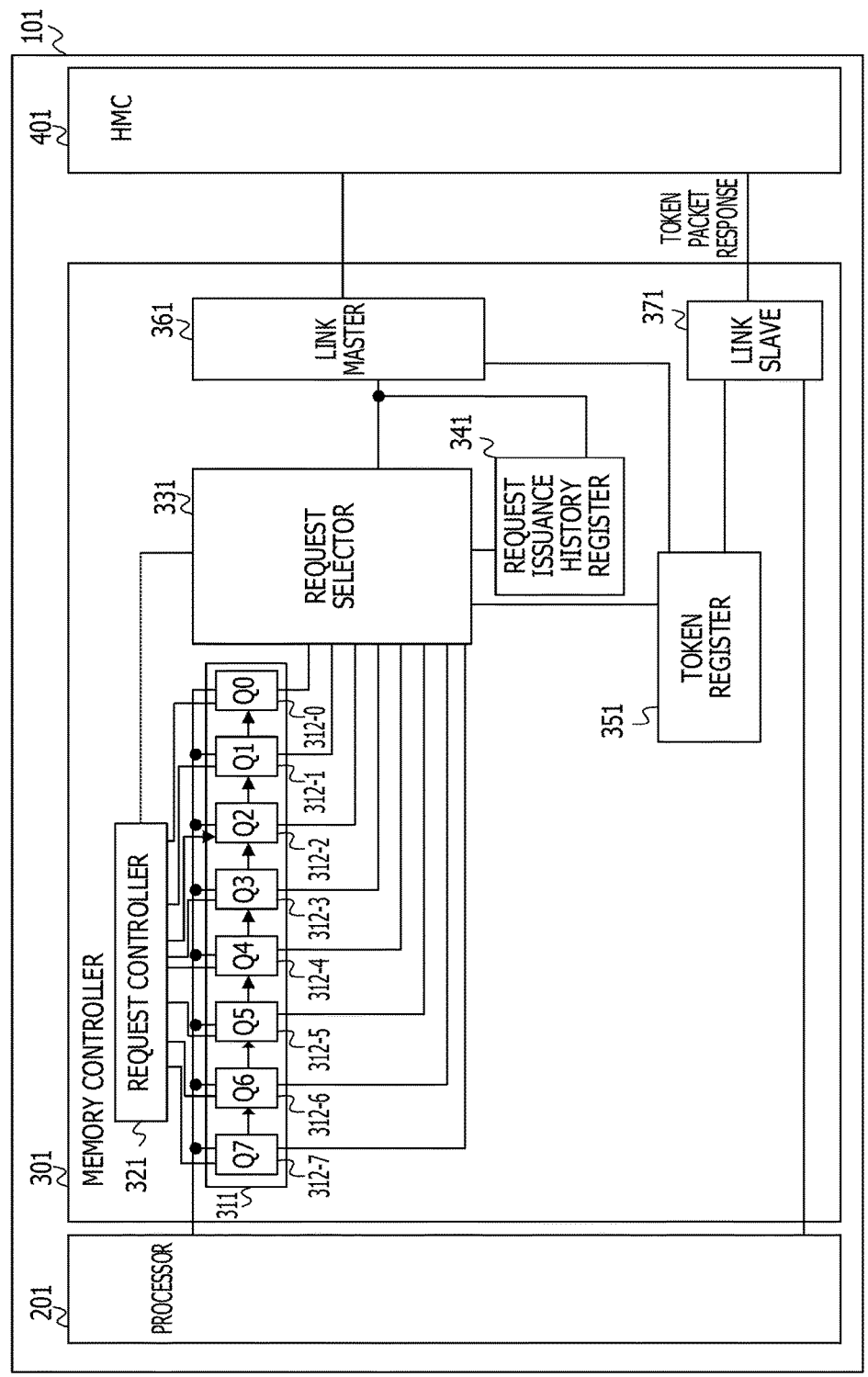
FIG. 1 illustrates an example of an information processing apparatus.

For example, a dynamic random access memory (DRAM) in the form of a HMC including a memory controller incorporated therein is provided as a memory device usable instead of a dual inline memory module (DIMM).

The HMC has packaging density that has been improved by using a DRAM stacking technology, and a large capacity has thus been achieved. The HMC includes a plurality of memory controllers incorporated therein, and data is transferred in a wide band by high-speed serial communication to an interface between a central processing unit (CPU) and memory in the HMC.

The HMC includes a plurality of (for example, two, four, or eight) interfaces (I/Fs) connected to a host and a plurality of quadrants respectively assigned to the I/Fs based on addresses. Each quadrant includes a plurality of vaults, and each vault includes a vault controller and a plurality of memory banks. For example, the vault is a unit memory including a plurality of memory banks and a vault controller. The memory banks are a plurality of stacked memories connected using through silicon vias (TSVs), and the vault controller is a memory controller that controls the memory banks.

The I/Fs of the HMC each include an input buffer that stores packets received from the host. After the packets are each transmitted from the input buffer to the corresponding vault controller, as many token packets as the transmitted packets are transferred to the host. The host includes a token register and transmits, to the HMC, packets, the number of which is within the register value of the token register. The host subtracts the number of transmitted packets from the value of the token register and adds, to the value of the token register, the number of packets indicated by the token packets transferred from the HMC.

History information regarding noncontinuous access based on noncontinuous addresses of pieces of data accessed by a processor is stored, and future noncontinuous access is predicted based on the history information regarding the addresses of the pieces of data accessed in the past. For example, a read address is output based on predicting noncontinuous access, and data corresponding to the read address is read from the memory.

For example, in a case where an input-output device having issued a memory read request tends to access continuous memory areas, data in a memory area contiguous with a memory area designated in accordance with the memory read request is, in advance, read out in addition to data in the designated memory area.

For example, consider a case where packets each including a request from the host to the HMC are transmitted. If all of the I/Fs of the HMC are connected to the host, the packets are each distributed (transmitted), based on the address for the request, to a corresponding one of the I/Fs that directly belongs to the quadrant including a memory bank to be accessed. For example, only some of the I/Fs are connected to the host, the packets are transmitted to the connected I/Fs, and memory banks of the respective designated addresses are accessed through a switch in the HMC.

If the addresses of the memories to be accessed are evenly distributed to the plurality of vaults, the input buffer is not filled with the packets. For example, if one quadrant, one vault, or one memory bank in one vault is repeatedly accessed, the process speed is decreased, and free space of the input buffer is reduced. The host is thus no longer able to transmit a packet, and the throughput may be deteriorated.

FIG. 1 illustrates an example of an information processing apparatus.

An information processing apparatus 101 includes a processor 201, a memory controller 301, and a HMC 401. The information processing apparatus 101 may be a computer such as a server or a PC.

The processor 201 issues requests to the HMC 401. The processor 201 may be, for example, a CPU.

The memory controller 301 receives the requests from the processor 201 and transmits the received requests to the HMC 401 in order in accordance with a predetermined rule.

The memory controller 301 includes a first-in first-out (FIFO) 311, a request controller 321, a request selector 331, a request issuance history register 341, a token register 351, a link master 361, and a link slave 371.

The FIFO 311 stores a request queue in which the requests issued by the processor 201 are arranged in order of issuance. The FIFO 311 may be, for example, a shift register. The FIFO 311 includes flip-flops 312-$m$ (m ranges from 0 to 7). The FIFO 311 may be an example of a buffer.

The flip-flops 312-$m$ are connected in series. The flip-flops 312-1 to 312-7 store the requests. The flip-flops 312-1 to 312-7 each output the corresponding stored request to a corresponding one of the flip-flops 312-0 to 312-6 subsequent thereto. The flip-flops 312-$m$ each output the corresponding stored request to the request selector 331. The request output to the request selector 331 includes information indicating what number (a queue number) the request is in the request queue, for example, information indicating which one of the flip-flops 312-$m$ stores the request. Hereinafter, the request stored in the corresponding flip-flop 312-$m$ may be denoted by Qm.

The request controller 321 controls reading and writing of data from and to requests stored in the flip-flops 312-$m$ and shifting of the requests. The request controller 321 receives an issued request from the request selector 331 and shifts one or more requests in the FIFO 311 based on information included in the issued request, the information indicating which one of requests (a queue number) in the request queue is selected, the information, for example, indicating the flip-flop 312-$m$ that stores the selected request. For example, the request controller 321 holds one or more requests older than the selected request and shifts one or more requests more recent than the selected request by one.

The request selector 331 selects, from the request queue, one of the requests that is to be issued. The request selector 331 transmits the request to a link master 361.

The request issuance history register 341 stores a predetermined number of most recent requests in order of selection (output) performed by the request selector 331. For example, the request issuance history register 341 stores addresses for the predetermined number of most recent requests in order of selection performed by the request selector 331.

The token register 351 stores the number of packets transmittable by the memory controller 301. The number of packets transmittable by the memory controller 301 may be, for example, the number of packets receivable by the HMC 401. The token register 351 receives the number of transmitted packets from the link master 361 and subtracts the number of transmitted packets from the number of transmittable packets. The token register 351 receives token packets from the link slave 371 and adds the number of packets indicated by the token packets to the number of transmittable packets.

The link master 361 generates a packet in such a manner as to add a header and a cyclic redundancy check code to the request received from the request selector 331 and transmits the packet to the HMC 401. The link master 361 generates a packet related to the received request and transmits the packet to the HMC 401. For example, if the request is a read command for requesting readout of data, a packet including the read command is generated and transmitted. For example, if the request is a write command for requesting writing of data, and if the data to be written is large, the written data is divided into pieces of data, and a plurality of packets are generated and transmitted, the plurality of packets being a packet including the write command and at least one of the pieces of divided written data and at least one packet including the remaining one or more pieces of divided written data. The link master 361 notifies the token register 351 of the number of transmitted packets (the number of packets).

The link slave 371 receives each token packet from the HMC 401 and transmits the token packet to the token register 351. The link slave 371 receives a response including data read out from the HMC 401 and transmits the response to the processor 201.

The HMC 401 is a memory device that stores data. The HMC 401 reads or writes data in response to the received request.

Figure 2:
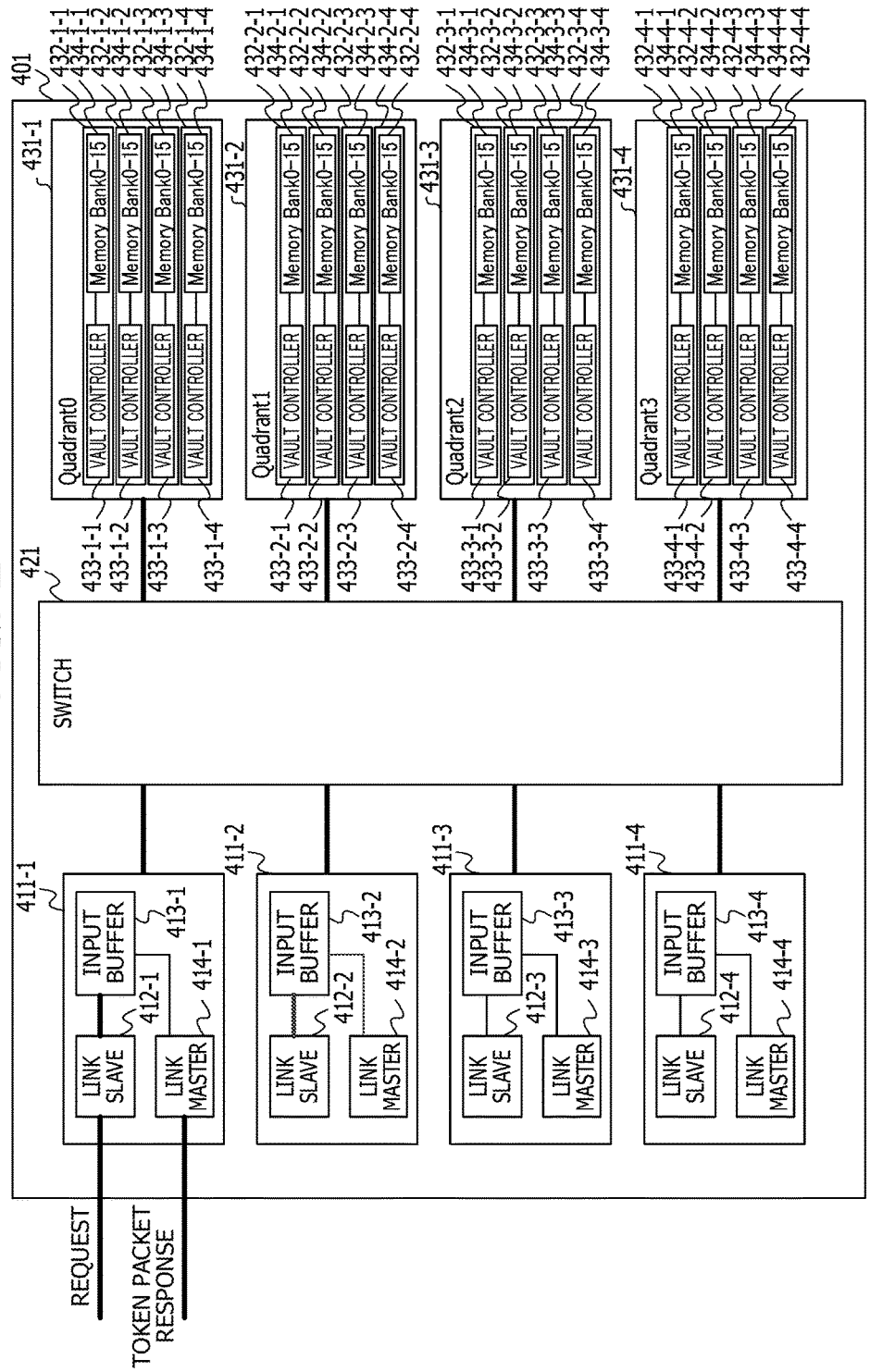
FIG. 2 illustrates an example of a hybrid memory cube (HMC)

FIG. 2 illustrates an example of a HMC. The HMC 401 includes link interface controllers 411-$i$ (i ranges from 1 to 4), a switch 421, and quadrants 431-$i$.

The link interface controllers 411-$i$ are connected to the switch 421. When communicating with the quadrants 431-$i$, the link interface controllers 411-$i$ perform the communication through the switch 421.

Each link interface controller 411-$i$ includes a link slave 412-$i$, an input buffer 413-$i$, and a link master 414-$i$.

For example, only the link interface controller 411-1 of the link interface controllers 411-$i$ may be used, and the link interface controller 411-1 is connected to and communicates with the memory controller 301. The number of link interface controllers 411-$i$ that are connected to and communicate with the memory controller 301 may be any number.

The switch 421 connects the link interface controllers 411-$i$ and the quadrants 431-$i$ to each other. Communication is performed between any one of the link interface controllers 411-$i$ and any one of the quadrants 431-$i$ through the switch 421. The switch 421 may be, for example, a crossbar switch.

Each quadrant 431-$i$ includes vaults 432-$i$-$j$ (j ranges from 1 to 4). The quadrant 431-$i$ may be a group of the vaults 432-$i$-$j$, the group being associated with the corresponding link interface controller 411-$i$. The link interface controllers 411-1 to 411-4 are respectively associated with the quadrants 431-1 to 431-4. Each quadrant 431-$i$ associated with a corresponding one of the link interface controllers 411-$i$ may be referred to as the quadrant 431-$i$ directly belonging to the link interface controller 411-$i$. Each link interface controller 411-$i$ accesses the corresponding quadrant 431-$i$ directly belonging thereto faster than a quadrant 431-$i$ that does not directly belong to the link interface controller 411-$i$. The quadrant 431-$i$ may be an example of the memory group. Hereinafter, the vaults 432-1-1 to 432-4-4 may be respectively referred to as vaults 0 to 15.

Each vault 432-$i$-$j$ includes a vault controller 433-$i$-$j$ and a memory bank group 434-$i$-$j$. Each vault 432-$i$-$j$ is assigned an address (vault address). The vault 432-$i$-$j$ may be an example of a memory unit.

The vault controller 433-*i*-*j* controls the memory bank group 434-*i*-*j*. For example, the vault controller 433-*i*-*j* controls reading and writing of data from and to a memory bank in the memory bank group 434-*i*-*j*.

The memory bank group 434-*i*-*j* is a group of memory banks. The memory bank group 434-*i*-*j* may have 16 memory banks 0 to 15.

Figure 3:
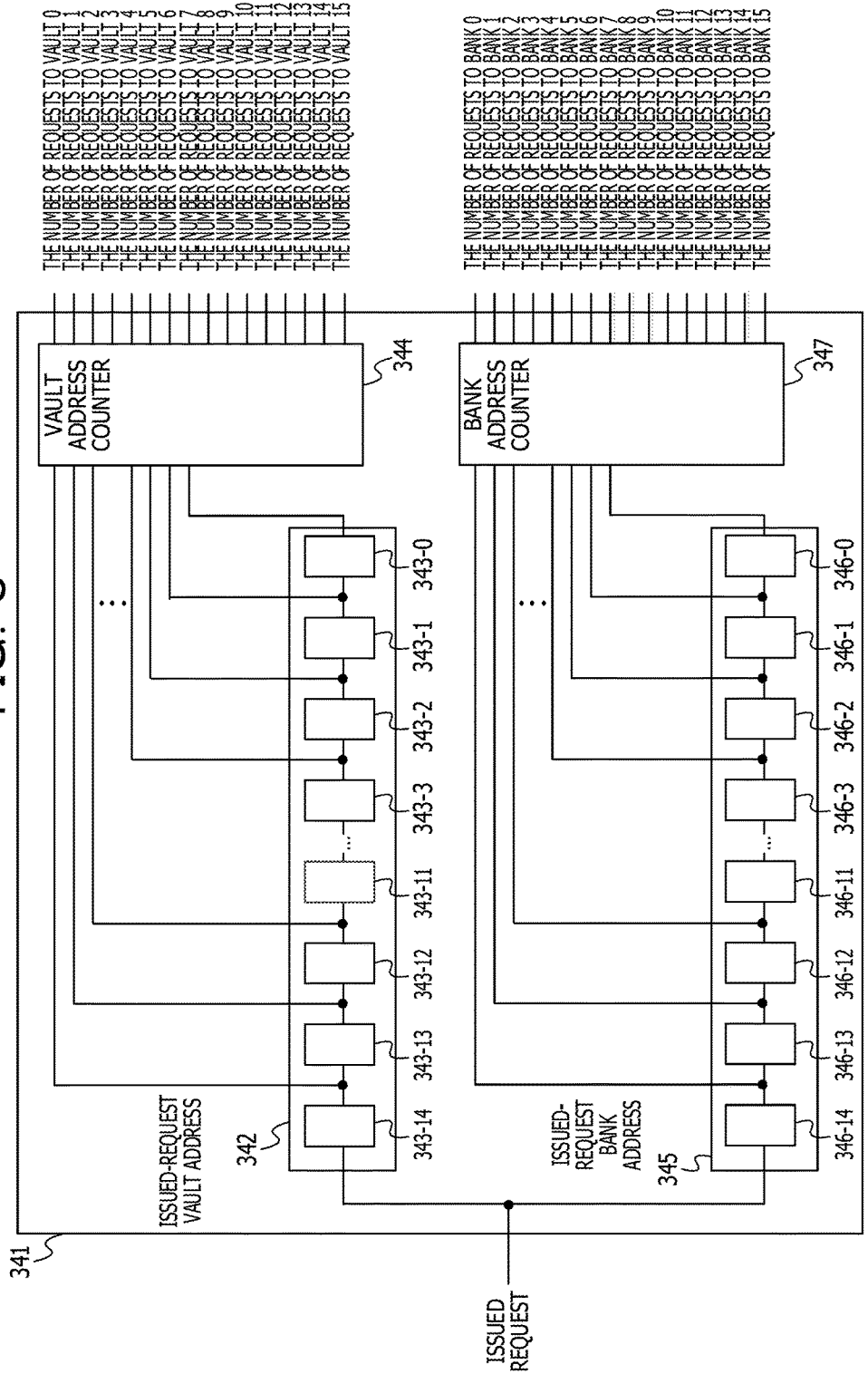
FIG. 3 illustrates an example of a request issuance history register.

FIG. 3 illustrates an example of a request issuance history register. The request issuance history register 341 includes FIFOs 342 and 345, a vault address counter 344, and a bank address counter 347.

The FIFO 342 stores, in order of output, addresses (hereinafter, issued-request vault addresses) of the respective vaults 432-*i*-*j* included in the most recent requests output by the request selector 331. The FIFO 342 includes flip-flops 343-*n* (n ranges from 0 to 14). For example, the FIFO 342 stores 15 issued-request vault addresses.

The flip-flop 343-14 receives a request output from the request selector 331 and stores therein the issued-request vault address included in the received request. After the request selector 331 outputs the request, the flip-flops 343-1 to 343-14 each output an issued-request vault address stored therein to a corresponding one of the flip-flops 343-0 to 343-13 subsequent thereto. The flip-flops 343-0 to 343-13 store therein the issued-request vault addresses input from the flip-flops 343-1 to 343-14 prior thereto. As described above, when the request selector 331 issues a new request, pieces of data (issued-request vault addresses) in the FIFO 342 are shifted, and the FIFO 342 stores therein the 15 most recent issued-request vault addresses in order of the issuance. The number of the flip-flops 343-*n* is not limited to 15 and may be any number. The flip-flops 343-*n* transmit the stored issued-request vault addresses to the vault address counter 344.

The vault address counter 344 receives the issued-request vault addresses input from the flip-flops 343-*n* and counts the addresses of each of the vaults 0 to 15 indicated by the issued-request vault addresses. The vault address counter 344 outputs, to the request selector 331, the count of the addresses of each of the vaults 0 to 15 as the number of requests to the corresponding one of the vaults 0 to 15.

The FIFO 345, in order of issuance, stores therein the addresses of the memory banks included in the most recent requests issued by the request selector 331 (hereinafter, issued-request bank addresses). The FIFO 345 includes flip-flops 346-*n* (n ranges from 0 to 14). For example, the FIFO 342 stores therein 15 issued-request bank addresses.

The flip-flop 346-14 receives a request issued by the request selector 331 and stores therein the issued-request bank address included in the received request. After the request selector 331 issues the request, the flip-flops 346-1 to 346-14 each output the issued-request bank address stored therein to a corresponding one of the flip-flops 346-0 to 346-13 subsequent thereto. The flip-flops 346-0 to 346-13 store therein the issued-request bank addresses input from the flip-flops 346-1 to 346-14 prior thereto. As described above, when the request selector 331 issues a new request, pieces of data in the FIFO 345 (issued-request bank addresses) are shifted, and the FIFO 345 stores therein the 15 most recent issued-request bank addresses in order of the issuance. The number of the flip-flops 346-*n* is not limited to 15 and may be any number. The flip-flops 346-*n* transmit the stored issued-request bank addresses to the bank address counter 347.

The bank address counter 347 receives the issued-request bank addresses input from the flip-flops 346-*n* and counts the addresses of each of the memory banks 0 to 15 indicated by the issued-request bank addresses. The bank address counter 347 outputs, to the request selector 331, the count of the addresses of each of the banks 0 to 15 as the number of requests to the corresponding one of the banks 0 to 15.

Figure 4:
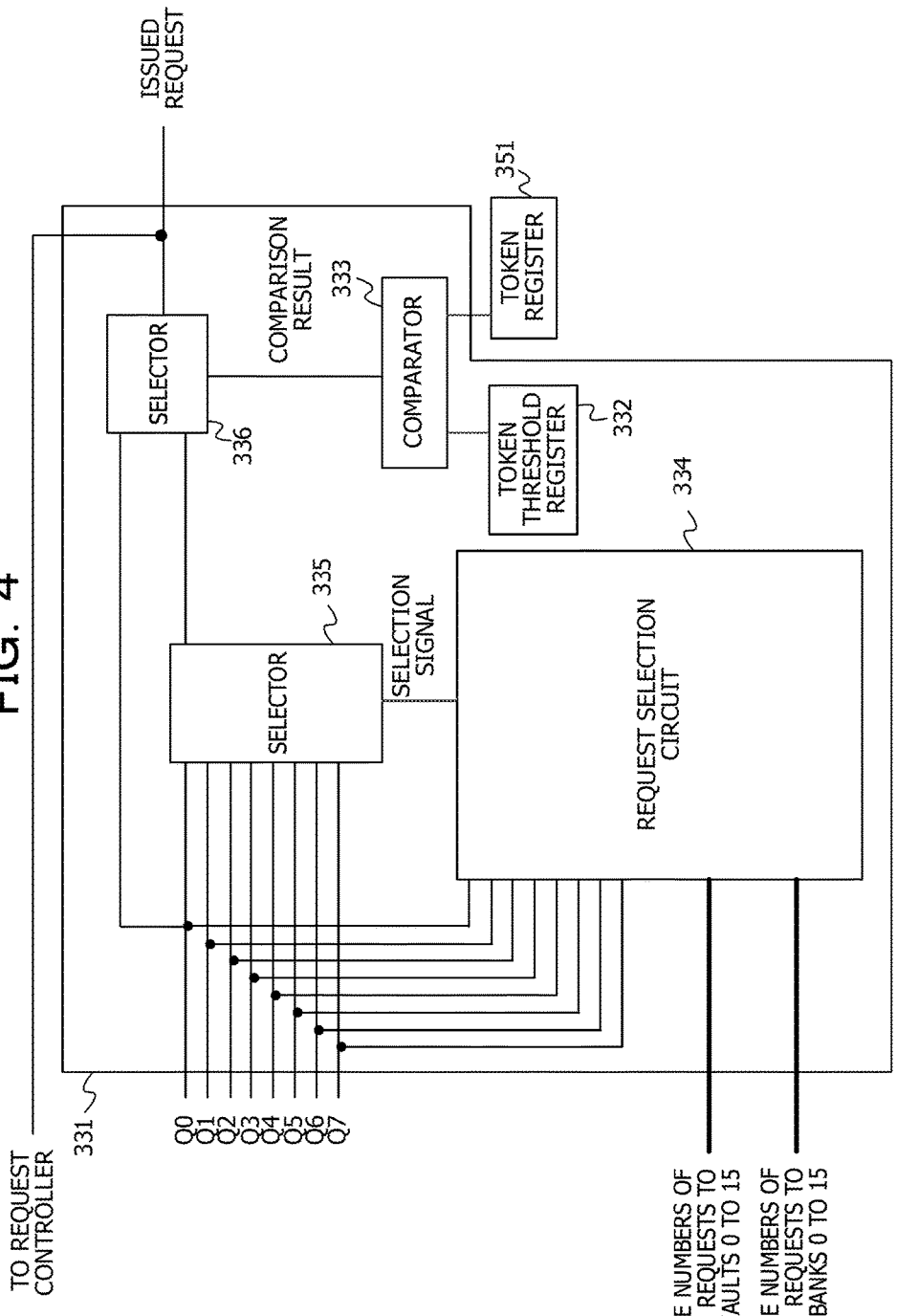
FIG. 4 illustrates an example of a request selector.

FIG. 4 illustrates an example of a request selector. The request selector 331 includes a token threshold register 332, a comparator 333, a request selection circuit 334, and selectors 335 and 336.

The token threshold register 332 stores therein a threshold. A value may be set in advance as the threshold.

The comparator 333 compares the value stored in the token register 351, for example, the number of packets transmittable by the memory controller 301 with the threshold stored in the token threshold register 332 and transmits a comparison result to the selector 336. For example, if the value stored in the token register 351 is equal to or higher than the threshold, the comparison result may be L (=0). If the value stored in the token register 351 is lower than the threshold, the comparison result may be H (=1).

The request selection circuit 334 calculates a weighting of each of requests Q0 to Q7 based on the vault address and the bank address included in the corresponding request and based on the number of requests to each of the vaults 0 to 15 and the number of requests to each of the banks 0 to 15 that are input from the request issuance history register 341. For example, the weighting may be expressed in nine bits.

The weightings of requests may be calculated in the following manner, for example. The request selection circuit 334 judges whether the requests stored in the request issuance history register 341 include a request having been transmitted to a quadrant 431*i* that is the same as the quadrant 431*i* to which a request is to be transmitted. The quadrant 431*i* to which the request is to be transmitted may be judged based on the vault address. Whether the requests stored in the request issuance history register 341 include a request having been transmitted to a specific quadrant 431*i* may be judged based on the number of requests to the corresponding one of the vaults 0 to 15. For example, if the number of requests to the vault 0 is equal to or higher than 1, it may be judged that the requests stored in the request issuance history register 341 include a request having been transmitted to the quadrant 431-1. If the requests stored in the request issuance history register 341 include a request having been transmitted to a quadrant 431*i* that is the same as the quadrant 431*i* to which a request is to be transmitted, the request selection circuit 334 sets the most significant bit of the weighting to 1. If the requests stored in the request issuance history register 341 do not include a request having been transmitted to a quadrant 431*i* that is the same as the quadrant 431*i* to which a request is to be transmitted, the request selection circuit 334 sets the most significant bit of the weighting to 0. The most significant bit of the weighting of a request indicates whether at least one of requests stored in a command issuance history register has been transmitted to the quadrant 431*i* to which the weighting target request is to be transmitted. For example, the weighting of a request may be expressed in 12 bits, and the number of times at least one of the requests stored in the command issuance history register has been transmitted to the quadrant to which the weighting target request is to be transmitted may be set in the higher first to fourth bits in the weighting (the lower ninth to 12th bits).

The request selection circuit 334 sets, in the lower fifth to eighth bits of the weighting of a request, the number of requests having been transmitted to the vault having the same address as the vault address of the request. The lower fifth to eighth bits of the weighting of a request indicate the number of times at least one of the requests stored in the command issuance history register has been transmitted to the vault 432-*i*-*j* to which the weighting target request is to be transmitted.

The request selection circuit 334 sets, in the lower first to fourth bits of the weighting, the number of requests having been transmitted to the bank having the same address as the bank address of the request.

The request selection circuit 334 selects the request that has the lowest weighting. Accordingly, a request to be transmitted to the quadrant to which at least one of the requests stored in the command issuance history register has been transmitted least frequently is selected, or a request to be transmitted to a quadrant to which a request has not been transmitted is selected. If there are multiple requests to be transmitted to the quadrant to which at least one of the requests has been transmitted least frequently or multiple requests to be transmitted to a quadrant to which a request has not been transmitted, one of the requests that is to be transmitted to the vault 432*i*-*j* to which at least one of the requests stored in the command issuance history register has been transmitted least frequently is selected. If there are multiple requests to be transmitted to the vault 432-*i*-*j* to which at least one of the requests stored in the command issuance history register has been transmitted least frequently, one of the requests that is to be transmitted to the memory bank to which at least one of the requests stored in the command issuance history register has been transmitted least frequently is selected.

The request selection circuit 334 transmits a selection signal indicating the selected request to the selector 335.

The number of requests to a vault and the number of requests to a memory bank that are each expressed in four bits are used as the weighting, but whether the same vault is present and whether the same memory bank is present may each be expressed in one bit. This may lead to circuit scale reduction.

The selector 335 receives the requests Q0 to Q7 and the selection signal. The selector 335 selects one of the requests Q0 to Q7 that is indicated by the received selection signal and outputs the request to the selector 336.

Based on the comparison result, the selector 336 selects the request Q0 or the request output from the selector 335 and outputs the selected request. If the comparison result is L, for example, if the value stored in the token register 351 is equal to or higher than the threshold, the selector 336 selects and outputs the request Q0. If the comparison result is H, for example, if the value stored in the token register 351 is lower than the threshold, the selector 336 selects and outputs the request output from the selector 335. The output request may also be referred to as an issued request.

Figure 5:
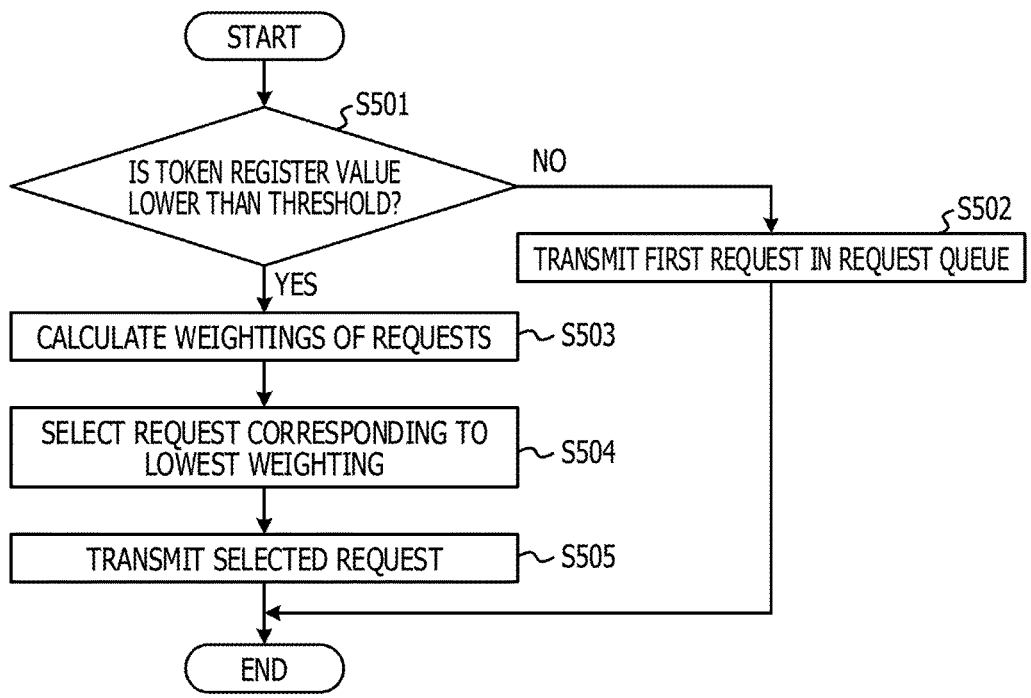
FIG. 5 illustrates an example of a request selection process.

FIG. 5 illustrates an example of a request selection process. In Operation S501, the comparator 333 compares the value stored in the token register 351, for example, the number of packets transmittable by the memory controller 301 with the threshold stored in the token threshold register 332 and transmits the comparison result to the selector 336. If the value stored in the token register 351 is equal to or higher than the threshold, the control proceeds to Operation S502. If the value stored in the token register 351 is lower than the threshold, the control proceeds to Operation S503.

In Operation S502, the selector 336 selects the first request Q0 in the request queue and outputs the request Q0 to the link master 361.

In Operation S503, the request selection circuit 334 calculates the weightings of the requests Q0 to Q7 based on the addresses for the requests Q0 to Q7, the number of requests to each of the vaults 0 to f in the history, and the number of requests to each of the memory banks 0 to f in the history.

In Operation S504, the request selection circuit 334 outputs a selection signal indicating a request corresponding to the lowest weighting to the selector 335. The selector 335 selects one of the requests Q0 to Q7 that is indicated by the selection signal and outputs the selected request to the selector 336.

In Operation S505, the selector 336 selects the request input from the selector 335 and outputs the request to the link master 361. The link master 361 generates a packet including the request and transmits the packet to the HMC 401.

Figure 6:
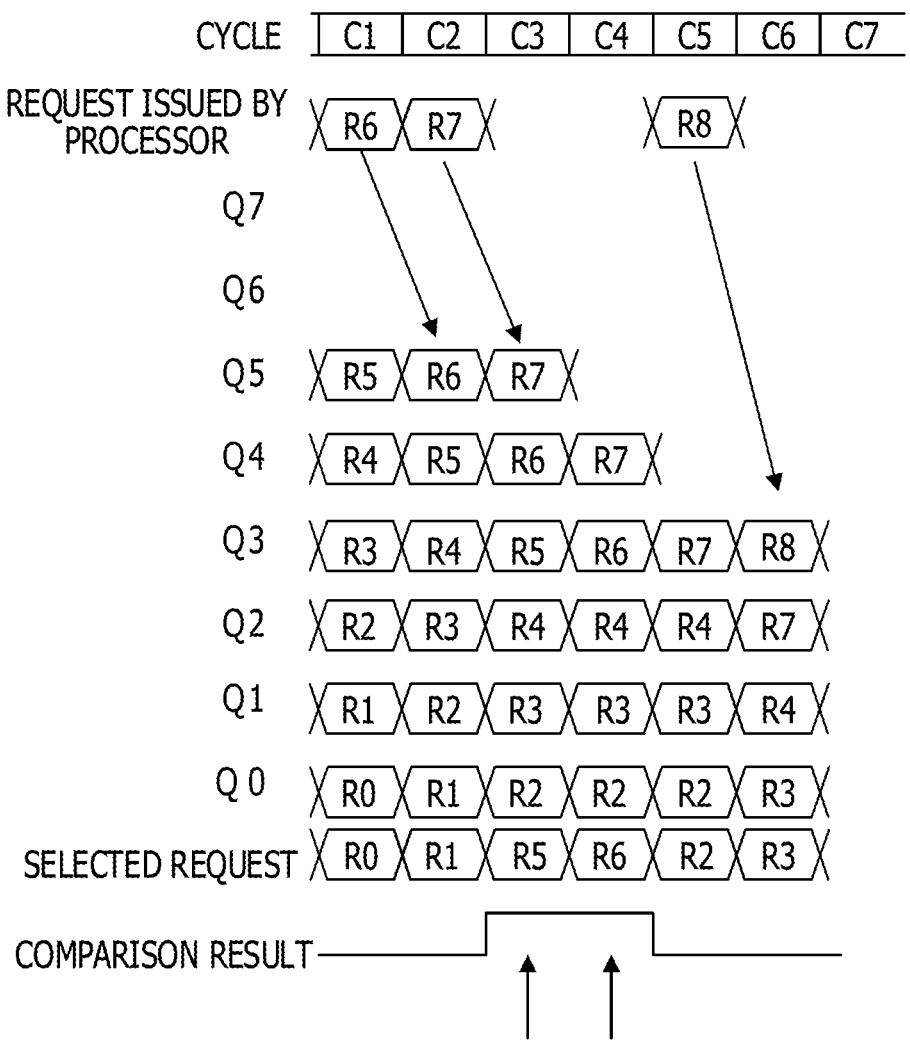
FIG. 6 illustrates an example of a timing chart of a memory controller.

FIG. 6 illustrates an example of a timing chart of a memory controller. In Cycle C1, requests Q0 to Q5 in the request queue stored in the FIFO 311 are respectively requests R0 to R5. The processor 201 issues a request R6. The value stored in the token register 351 is equal to or higher than the threshold, a comparison result indicating whether the value stored in the token register 351 is equal to or higher than the threshold is not asserted, and the first request R0 is selected and output.

In Cycle C2, the processor 201 issues a request R7. The requests R0 to R5 stored in the FIFO 311 are shifted by one. Accordingly, the request R0 is deleted, and the requests Q0 to Q5 are respectively the requests R1 to R4. The request R6 is stored at the end of the request queue, and the request Q5 is the request R6. The comparison result is not asserted, and the first request R1 is selected and output.

In Cycle C3, the requests R1 to R6 stored in the FIFO 311 are shifted by one. Accordingly, the request R1 is deleted, and the requests Q0 to Q5 are respectively the requests R2 to R6. The request R7 is stored at the end of the request queue, and Q5 is the request R7. The value stored in the token register 351 becomes lower than the threshold, and the comparison result is asserted. The request selection circuit 334 selects and outputs the request Q3 that is the request R5.

In Cycle C4, among the requests R2 to R7 stored in the FIFO 311, the requests R2 to R4 prior to (older than) the request R5 selected in Cycle C3 are held, and the requests R6 and R7 subsequent to (more recent than) the request R5 are shifted by one. Accordingly, the request R1 is deleted, and the requests Q0 to Q4 are respectively the requests R2 to R4, R6, and R7. The comparison result has been asserted. The request selection circuit 334 selects and outputs the request Q3 that is the request R6.

In Cycle C5, the processor 201 issues a request R8. Among the requests R2 to R4, R6, and R7 stored in the FIFO 311, the requests R2 to R4 prior to the request R6 selected in Cycle C4 are held, and the request R7 subsequent to the request R6 is shifted by one. Accordingly, the request R6 is deleted, and the requests Q0 to Q3 are respectively the requests R2 to R4, and R7. The value stored in the token register 351 becomes equal to or higher than the threshold, the comparison result is negated, and the request R2 is selected and output.

In Cycle C6, the requests R2 to R4 and R7 stored in the FIFO 311 are shifted by one. Accordingly, the request R2 is deleted, and the requests Q0 to Q2 are respectively the requests R3, R4, and R7. The request R8 is stored at the end of the request queue, and the request Q3 is thus the request R8. The comparison result is not asserted, and the first request R3 is selected and output.

With the information processing apparatus, a request to be transmitted to a quadrant, a vault, or a memory bank to which at least one of requests in the past has been transmitted less frequently is selected based on the history of the addresses for the requests, and the request is transmitted. Accordingly, access events to be made to the same quadrant, the same vault, or the same memory bank are distributed, and the throughput may be enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a memory device configured to store data;
    an arithmetic processor configured to issue a request to be transmitted to the memory device; and
    a memory controller including:
        a buffer configured to store one or more unselected requests that are issued by the arithmetic processing processor and are not selected;
        a history register configured to hold one or more addresses for one or more transmitted requests that have been transmitted to the memory device; and
        a selector configured to select, from the one or more unselected requests stored in the buffer, a target request to be transmitted to the memory device based on the one or more addresses stored in the history register and transmit the target request to the memory device,
    the memory controller is configured to select, from among the one or more unselected requests, a request belonging to one of the plurality of memory groups having a smallest number of transmission times of the one or more transmitted requests as the target request.

2. The information processing apparatus according to claim 1, wherein the memory device includes a plurality of interface controllers coupled to the memory controller and a plurality of memory groups provided for each of the plurality of interface controllers.

3. The information processing apparatus according to claim 2, wherein the plurality of memory groups each include a plurality of memories, and wherein the plurality of memories each include a controller and a plurality of memory banks which are controlled by the controller.

4. The information processing apparatus according to claim 3, wherein the memory controller is configured to select, from among the one or more unselected requests, a request belonging to one of the plurality of memory banks having a smallest number of transmission times of the one or more transmitted requests as the target request and transmit the target request.

5. The information processing apparatus according to claim 1, wherein the buffer is configured to store the one or more unselected requests in order of issuance from the arithmetic processing processor, one or more older unselected requests than the target request included in the one or more unselected requests are held in the buffer, and one or more recent unselected requests than the target request included in the one or more unselected requests are shifted in the buffer.

6. The information processing apparatus according to claim 1, wherein the buffer includes a plurality of flip-flops which are coupled in series and each stores the respective one or more unselected requests, and
    when the selector selects the target request stored in one flip-flop, the memory controller holds one or more older unselected requests which are stored in one or more first flip-flops earlier than the target request and shifts one or more newer unselected requests which are stored in one or more second flip-flops later than the target request.

7. A memory controller comprising:
    a buffer configured to store one or more unselected requests that are issued by an arithmetic processing processor and are not selected;
    a history register configured to hold one or more addresses for one or more transmitted requests that have been transmitted to a memory device; and
    a selector configured to select, from the one or more unselected requests stored in the buffer, a target request to be transmitted to the memory device based on the one or more addresses stored in the history register and transmit the target request to the memory device,
    the selector is coupled to a plurality of interface controllers of the memory device, and the selector is configured to select, from among the one or more unselected requests, a request belonging to one of a plurality of memory groups having a smallest number of transmission times of the one or more transmitted requests as the target request, each of the plurality of memory groups being provided the respective interface controllers.

8. The memory controller according to claim 7, wherein the selector is coupled to a plurality of interface controllers of the memory device, a plurality of memory groups each include a plurality of memories and each provided for the respective interface controllers, the plurality of memories each include a controller and a plurality of memory banks which are controlled by the controller, and the selector is configured to select, from among the one or more unselected requests, a request belonging to one of the plurality of memory banks having a smallest number of transmission times of the one or more transmitted requests as the target request.

9. The memory controller according to claim 7, wherein the buffer is configured to store the one or more unselected requests in order of issuance from the arithmetic processing processor, one or more older unselected requests than the target request and included in the one or more unselected requests are held in the buffer, and one or more recent unselected requests than the target request and included in the one or more unselected requests are shifted in the buffer.

10. The memory controller according to claim 7, wherein the buffer includes a plurality of flip-flops which are coupled in series and each stores the respective one or more unselected requests, and
    when the selector selects the target request stored in one flip-flop, one or more older unselected requests which are stored in one or more first flip-flops earlier than the target request are hold and one or more newer unselected requests which are stored in one or more second flip-flops later than the target request are shifted.

11. A memory control method comprising:
    storing, in a buffer, one or more unselected requests that are issued by an arithmetic processing processor to a memory device and is not selected;

holding, in a history register, one or more addresses for one or more transmitted requests that have been transmitted from the buffer to the memory device; selecting, from the one or more unselected requests stored in the buffer, a target request to be transmitted to the memory device, based on the one or more addresses in the history register; and transmitting the target request to the memory device, a request belonging to one of the plurality of memory groups having a smallest number of transmission times of the one or more transmitted requests is selected, from among the one or more unselected requests, as the target request.

12. The memory control method according to claim 11, wherein the requests are issued through a plurality of interface controllers included in the memory device to a plurality of memory groups each assigned to the respective interface controllers.

13. The memory control method according to claim 11, wherein the one or more unselected requests are stored in the buffer in order of issuance from the arithmetic processing processor, one or more older unselected requests than the target request and included in the one or more unselected requests are held in the buffer, and one or more recent unselected requests than the target request and included in the one or more unselected requests are shifted in the buffer.

14. The memory control method according to claim 11, wherein the buffer includes a plurality of flip-flops which are coupled in series and each stores the respective one or more unselected requests, and when the selector selects the target request stored in one flip-flop, one or more older unselected requests which are stored in one or more first flip-flops earlier than the target request are hold and one or more newer unselected requests which are stored in one or more second flip-flops later than the target request are shifted.

* * * * *